Patented Mar. 23, 1937

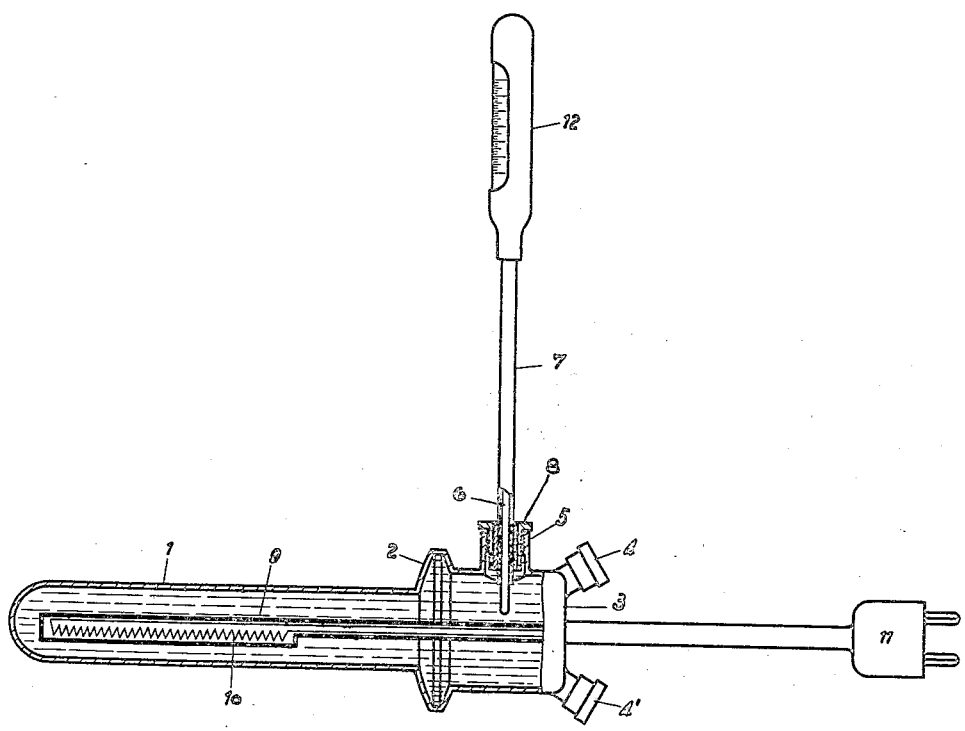

2,074,634

UNITED STATES PATENT OFFICE 2,074,634

TUBULAR HEATING DEVICE FOR GYNECOLOGICAL PURPOSES

Henri Ackermann, Strasbourg, France

Application May 27, 1935, Serial No. 23,735
In Austria June 2, 1934

1 Claim. (Cl. 128—401)

This invention relates to a heating device of tubular form and with an internal electric heating element which can be introduced into cavities of the human body for gynecological purposes.

In such apparatus the electric heating element is located in a perfectly fluid-tight manner in the interior of the tubular receiver and the annular space between the tube of the heater body and the walls of the receiver may be filled with a liquid in contact with the heating element on all sides. In this way uniform distribution of the heat over the whole surface of the tubular receiver and, when using liquids having a low boiling point, a very certain operation of the apparatus, are ensured.

The known heating devices of this kind are provided with a thermometer destined for testing the temperature of the receiver of the device, fixed to a metal tube bent at an angle, and the mercury bulb of this thermometer extends almost as far as the forward end of the receiver in order to obtain rapidly indications of the temperature existing in the active zone properly speaking of the device. This arrangement of the thermometer leads to numerous difficulties on assembly of the apparatus and other difficulties which the invention aims at avoiding.

According to the invention, the tubular receiver comprising the heating element embodies, beyond a shoulder limiting the part to be introduced, an enlarged chamber which is provided with a tube perpendicular to the axis of the receiver and serving to support the thermometer. It is not indispensable that the temperature should be measured in the receiver itself but, on the contrary, it may be measured in this chamber, which permits the use, instead of a bent thermometer tube, of an ordinary straight tube entering the chamber. Besides this, there are the following advantages:

The thermometer can rotate around its axis, its graduated scale may be brought into different positions, which ensures convenience of reading in all positions and taking account of all the local conditions which may be presented by the patient or by the doctor or by other attendants.

Further, the means for connecting the thermometer to the apparatus, as well as the thermometer itself, may be made at a lower price and in a more simple and robust manner so that the danger of breakage on assembly and during cleaning of the apparatus is reduced to a minimum.

Finally, it is possible, by reason of the arrangement of the thermometer tube in the chamber, to employ heating tubes of smaller size and thus to open up new fields of application for the apparatus. This arrangement also permits the very delicate means employed heretofore for obtaining tightness at the point of outlet of the thermometer to be replaced by more appropriate packing means having a more certain effect.

The improved heating device is advantageously combined with a transformer for reducing the potential employed to about 8 volts, which makes it unnecessary to employ a great amount of insulation.

An automatic switch could also be provided for stopping the current when a given maximum temperature is attained in the apparatus.

The attached drawing shows in longitudinal section by way of example, one embodiment of the invention.

The tubular part 1 of the heating device which is adapted to be introduced into the cavities of the body comprises, beyond a shoulder 2, an extension 3 serving as an entrance chamber and in free communication with the tubular part 1. Fluid is supplied by a pipe 4 located on this chamber and serving at the same time for holding the apparatus. For the same purpose the apparatus comprises also a second pipe 4' placed symmetrically relatively to the first mentioned. A third pipe 5 is located perpendicular to the axis of the apparatus and serves for the connection of the thermometer 6. The mercury tube of this thermometer is fitted in a metal tube 7 and it is somewhat longer than said tube so as to be adapted to enter the chamber 3. The fixing of this tube 7 is effected in a threaded plug 8 which is screwed in the pipe 5 and for the purpose of obtaining perfect fluid-tightness a rubber packing is inserted in the bore of the plug 8, in which packing the metal tube 7 is located. The graduated scale of the thermometer is conveniently located in a metal socket 12 which is fixed on the tube 7 in such a way that it can be rotated. The end of the chamber 3 is traversed by a tube 9 which is enlarged somewhat towards its forward end to enclose the heating element 10. Towards the outside the tube 9 may carry contact devices 11 which can be connected to the transformer.

The heating device thus described is manipulated in the same way as the devices of this kind already known. The device is conveniently filled with water.

Further, numerous constructive modifications can be applied to the device. Thus, for example, the front tube 1 and the enlarged chamber 3 may be formed of two separate parts and assembled by screw connections or the like. This would permit heating tubes 1 of different sizes to be used in conjunction with a single chamber 3, thus ensuring a considerable simplification and reduction in the purchase price.

I claim:

An electrically heated, liquid filled heating device for gynecological purposes comprising an elongated tubular casing closed at one end, and adapted to contain a liquid, said casing having a shoulder at its other end for limiting the insertion of the casing, a chamber of enlarged diameter beyond the shoulder in prolongation of and in communication with the tubular casing, an electrical heating device within the tubular casing and surrounded by the liquid therein, a filling opening in said chamber, a second opening in said chamber at right angles to the axis of the casing and a thermometer in said second opening having the bulb end thereof in the liquid in said chamber and the other end thereof projecting substantially at right angles to the casing.

HENRI ACKERMANN.